`US008829744B2`

United States Patent
Pal

(10) Patent No.: US 8,829,744 B2
(45) Date of Patent: Sep. 9, 2014

(54) COOLING ARRANGEMENT FOR END TURNS AND STATOR IN AN ELECTRIC MACHINE

(71) Applicant: Hamilton Sundstrand Corporation, Windsor Locks, CT (US)

(72) Inventor: Debabrata Pal, Hoffman Estates, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/865,273

(22) Filed: Apr. 18, 2013

(65) Prior Publication Data

US 2013/0234545 A1    Sep. 12, 2013

Related U.S. Application Data

(63) Continuation of application No. 12/729,399, filed on Mar. 23, 2010, now Pat. No. 8,525,375.

(51) Int. Cl.
| | |
|---|---|
| *H02K 9/00* | (2006.01) |
| *H02K 9/197* | (2006.01) |
| *H02K 5/18* | (2006.01) |
| *H02K 1/20* | (2006.01) |

(52) U.S. Cl.
CPC ............... *H02K 9/005* (2013.01); *H02K 9/197* (2013.01); *H02K 5/18* (2013.01); *H02K 1/20* (2013.01)
USPC ................................. 310/59; 310/58; 310/64

(58) Field of Classification Search
CPC ................. H02K 9/005; H02K 5/18
USPC ......................... 310/54, 57–59, 64
See application file for complete search history.

(56) References Cited

U.S. PATENT DOCUMENTS

| | | | | |
|---|---|---|---|---|
| 1,882,487 | A | * 10/1932 | Dupont | 310/65 |
| 2,818,515 | A | * 12/1957 | Dolenc | 310/57 |
| 2,951,954 | A | 9/1960 | Willyoung | |
| 4,980,588 | A | * 12/1990 | Ogawa | 310/68 D |
| 5,081,382 | A | 1/1992 | Collings et al. | |
| 5,173,629 | A | 12/1992 | Peters | |
| 5,331,238 | A | * 7/1994 | Johnsen | 310/58 |
| 5,491,371 | A | * 2/1996 | Ooi | 310/58 |
| 5,982,071 | A | * 11/1999 | Ehrick | 310/216.056 |
| 6,300,693 | B1 | * 10/2001 | Poag et al. | 310/54 |
| 6,617,715 | B1 | * 9/2003 | Harris et al. | 310/54 |
| 6,617,716 | B2 | * 9/2003 | Ishida | 310/58 |
| 6,685,447 | B2 | 2/2004 | Mabe et al. | |

(Continued)

*Primary Examiner* — Quyen Leung
*Assistant Examiner* — Naishadh Desai
(74) *Attorney, Agent, or Firm* — Carlson, Gaskey & Olds, P.C.

(57) ABSTRACT

An electric machine includes a stator having an outer circumference. Spaced apart first walls are arranged about the outer circumference and provide generally parallel first channels. A second wall adjoins the first wall and is arranged about the outer circumference providing a second channel in fluid communication with the first channels, thus, providing a tortuous fluid flow path about the circumference. The first and second channels have an inner surface. A structure is provided within at least one of the first and second channels. The structure has an outer surface spaced radially outward from the inner surface and at least partially defines the tortuous flow path between the outer and inner surfaces. The stator includes an end turn. An end cap extends axially and radially outward from the stator and provides an enclosure about the end turn in fluid communication with the exit associated with the flow path.

11 Claims, 4 Drawing Sheets

(56) References Cited

U.S. PATENT DOCUMENTS

| | | |
|---|---|---|
| 6,700,236 B2 * | 3/2004 | Umeda et al. .................. 310/54 |
| 6,727,609 B2 | 4/2004 | Johnsen |
| 6,791,232 B2 | 9/2004 | Tong |
| 6,870,292 B2 * | 3/2005 | Owada et al. ................. 310/194 |
| 6,982,506 B1 * | 1/2006 | Johnsen .......................... 310/61 |
| 7,009,317 B2 * | 3/2006 | Cronin et al. .................. 310/54 |
| 7,157,826 B2 | 1/2007 | Rajasingham |
| 7,208,854 B1 | 4/2007 | Saban et al. |
| 7,265,463 B2 | 9/2007 | Kusase et al. |
| 7,538,457 B2 | 5/2009 | Holmes et al. |
| 7,573,362 B2 | 8/2009 | Thiel et al. |
| 2003/0066638 A1 | 4/2003 | Qu et al. |
| 2005/0104460 A1 | 5/2005 | Kusase et al. |
| 2008/0024020 A1 | 1/2008 | Iund et al. |
| 2008/0093850 A1 | 4/2008 | Taneja et al. |
| 2008/0100159 A1 | 5/2008 | Dawsey et al. |
| 2008/0185924 A1 | 8/2008 | Masoudipour et al. |
| 2008/0238223 A1 | 10/2008 | Tilton et al. |
| 2010/0277016 A1 | 11/2010 | Dang et al. |
| 2011/0011557 A1 * | 1/2011 | Shelton, Jr. ..................... 165/45 |

* cited by examiner

US 8,829,744 B2

COOLING ARRANGEMENT FOR END TURNS AND STATOR IN AN ELECTRIC MACHINE

This application is a continuation of U.S. application Ser. No. 12/729,399 filed on Mar. 23, 2010, now issued as U.S. Pat. No. 8,525,375 on Sep. 3, 2013.

BACKGROUND

This disclosure relates to a cooling arrangement for a high power electric machine, such as a generator used in aerospace applications.

One type of generator liquid cooling arrangement provides annular cooling channels on an inner diameter of a housing adjacent to an outer diameter of a stator. Multiple annular cooling channels are axially spaced relative to one another along the housing about the stator. Cooling oil is supplied to the cooling channels through an inlet in the housing. The flow path through the annular cooling channels is tortuous such that the flow direction reverses in each axially successive annular cooling channel.

The stator typically includes a sleeve supported on the stator windings and in contact with the housing, which operates to seal the annular cooling channels relative to one another. At elevated operating temperatures, the housing experiences more thermal growth than the sleeve, which creates a radial gap between the annular cooling channels and the sleeve. Cooling fluid is permitted to leak between the annular cooling channels, causing the cooling fluid in adjacent annular cooling channels to flow in the same direction.

The stator typically includes end turns that extend opposite one another from a main stack. A rotating liquid spray is often used to cool stator end turns. Cooling fluid cast from the rotor inner diameter by centrifugal force coats the end turns. The cooling fluid falls from the end turns back onto the rotor.

SUMMARY

An electric machine includes a stator having an outer circumference. Spaced apart first walls are arranged about the outer circumference and provide generally parallel first channels. A second wall adjoins the first wall and is arranged about the outer circumference providing a second channel in fluid communication with the first channels, thus, providing a tortuous fluid flow path about the circumference. The first and second channels have an inner surface. A structure is provided within at least one of the first and second channels. The structure has an outer surface spaced radially outward from the inner surface and at least partially defines the tortuous flow path between the outer and inner surfaces.

In another aspect of the disclosure, the electric machine includes a housing within which the stator is arranged. The stator includes a main stack with an end turn extending generally axially from the main stack. Cooling channels are provided in at least one of the housing or stator and are in fluid communication with an exit provided near the end turn that is configured to provide cooling fluid to the end turn. An end cap extends from the main stack axially and radially outward and provides an enclosure about the end turn in fluid communication with the exit. The end cap includes an outlet in fluid communication with the inlet that is configured to drain the cooling fluid from the enclosure.

BRIEF DESCRIPTION OF THE DRAWINGS

The disclosure can be further understood by reference to the following detailed description when considered in connection with the accompanying drawings wherein.

DETAILED DESCRIPTION

Figure 1:
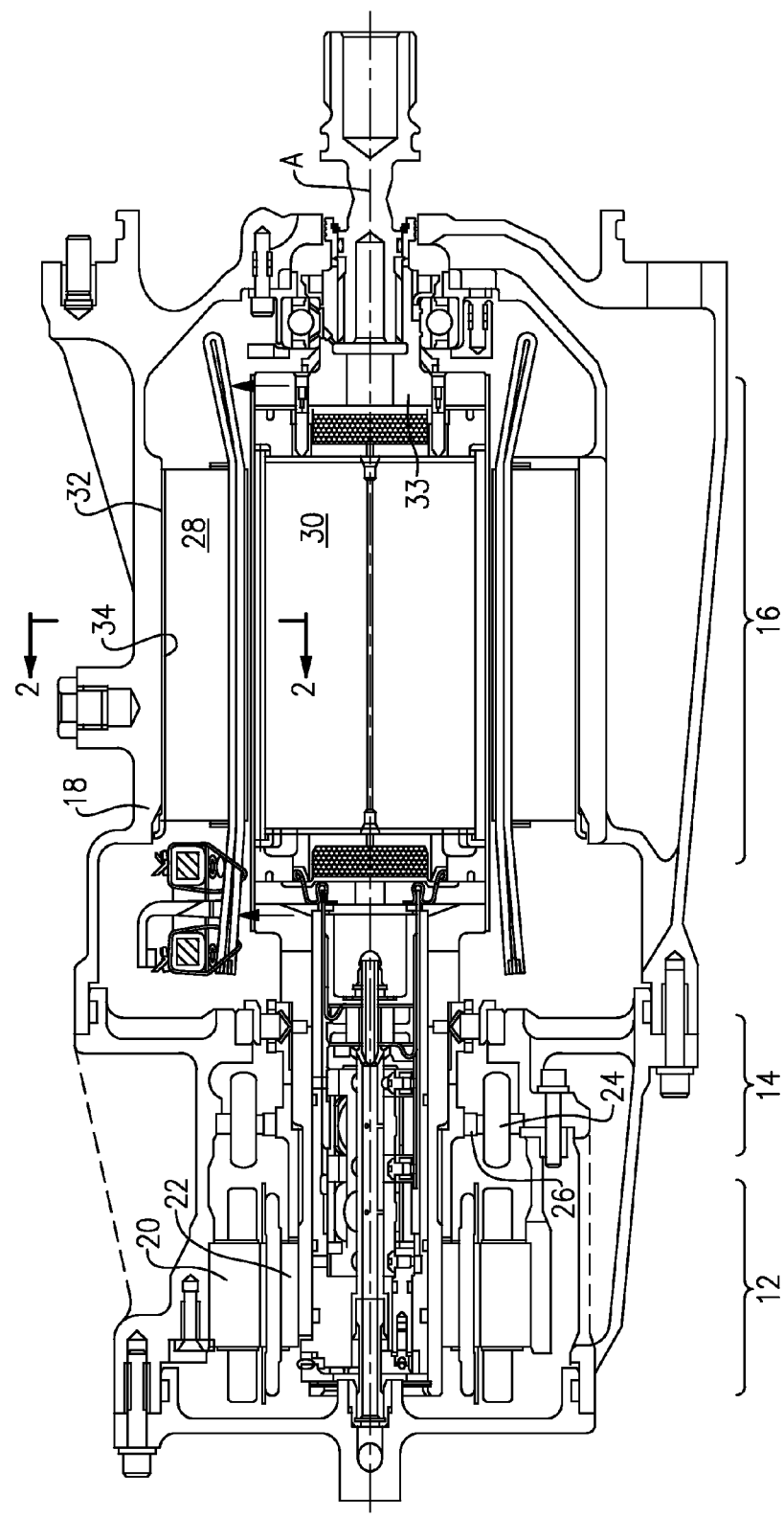
FIG. 1 is a cross-sectional view of an electric machine, and more particularly, a generator.

An example generator 10 is illustrated in FIG. 1. The generator 10 includes exciter, permanent magnet generator (PMG) and generator sections 12, 14, 16. Each of the sections 12, 14, 16 is arranged within a housing 18, which may be provided by multiple housing sections secured to one another to facilitate assembly and service. The exciter section 12 includes an exciter stator 20 and an exciter rotor 22; the PMG section 14 includes a PMG stator 24 and a PMG rotor 26; and the generator section 16 includes a generator stator 28 and generator rotor 30 mounted on a shaft 33.

Figure 2:
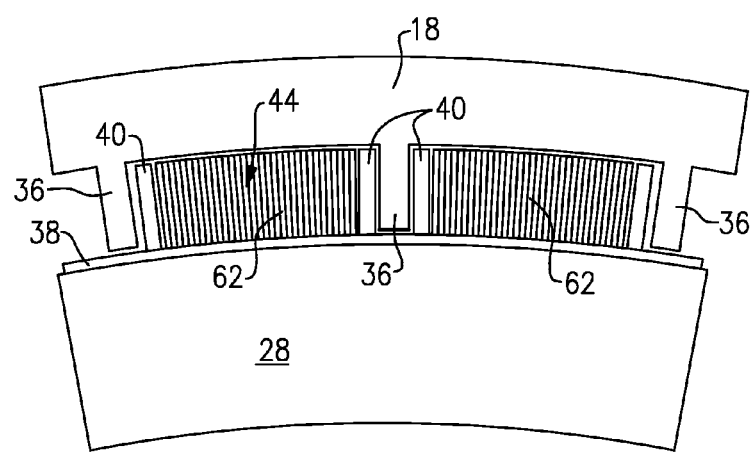
FIG. 2 is a partial cross-sectional view of a portion of the generator taken along line 2-2 of FIG. 1.
Figure 4:
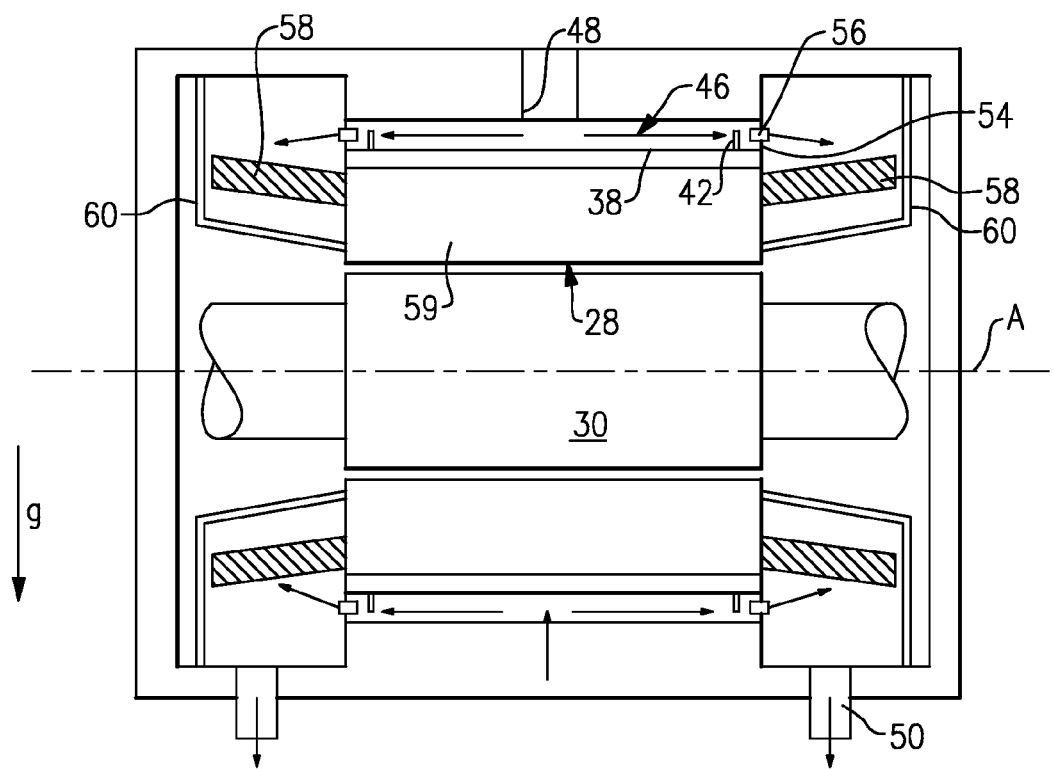
FIG. 4 is a schematic view illustrating end caps provided about end turns.

The generator stator 28 includes a stator outer circumference or diameter 32 that is arranged within close proximity to an inner diameter 34 of the housing 18. In one example, the stator 28 includes a sleeve 38 providing the outer diameter 32, best shown in FIG. 2. The sleeve 38 is mounted on windings of a main stack 59 (FIG. 4). With continuing reference to FIG. 2, housing fins 36 may extend radially inwardly from the housing 18 to be in close proximity to or engagement with the sleeve 38, which may increase conductive heat transfer.

Figure 3A:
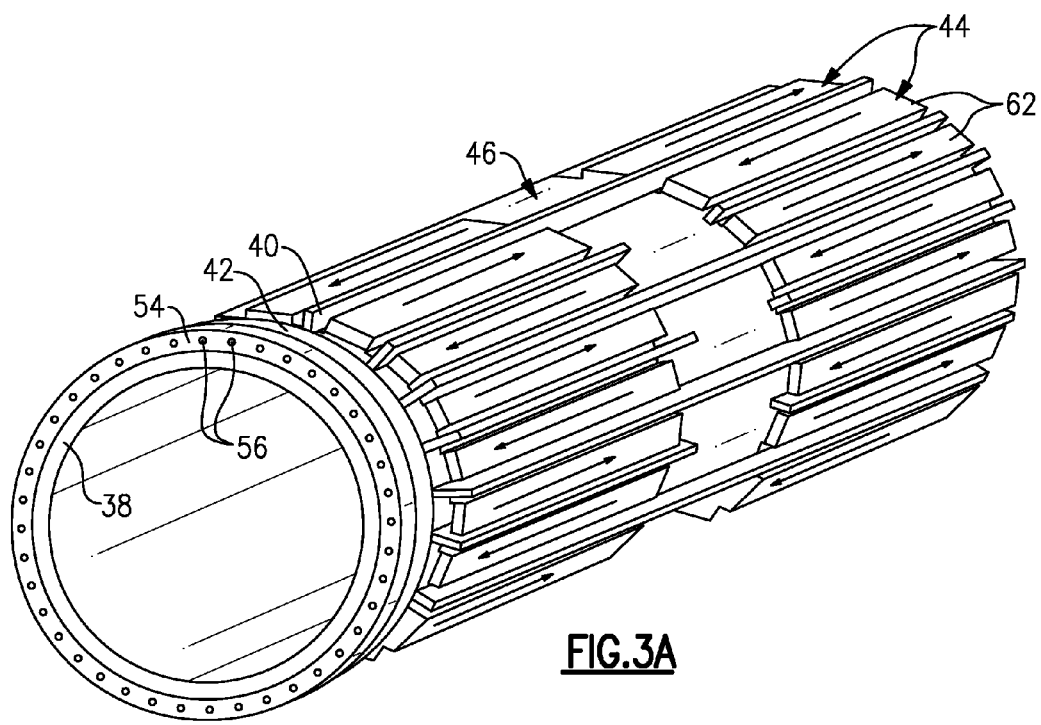
FIG. 3A is a perspective view of a stator with a sleeve.
Figure 3B:
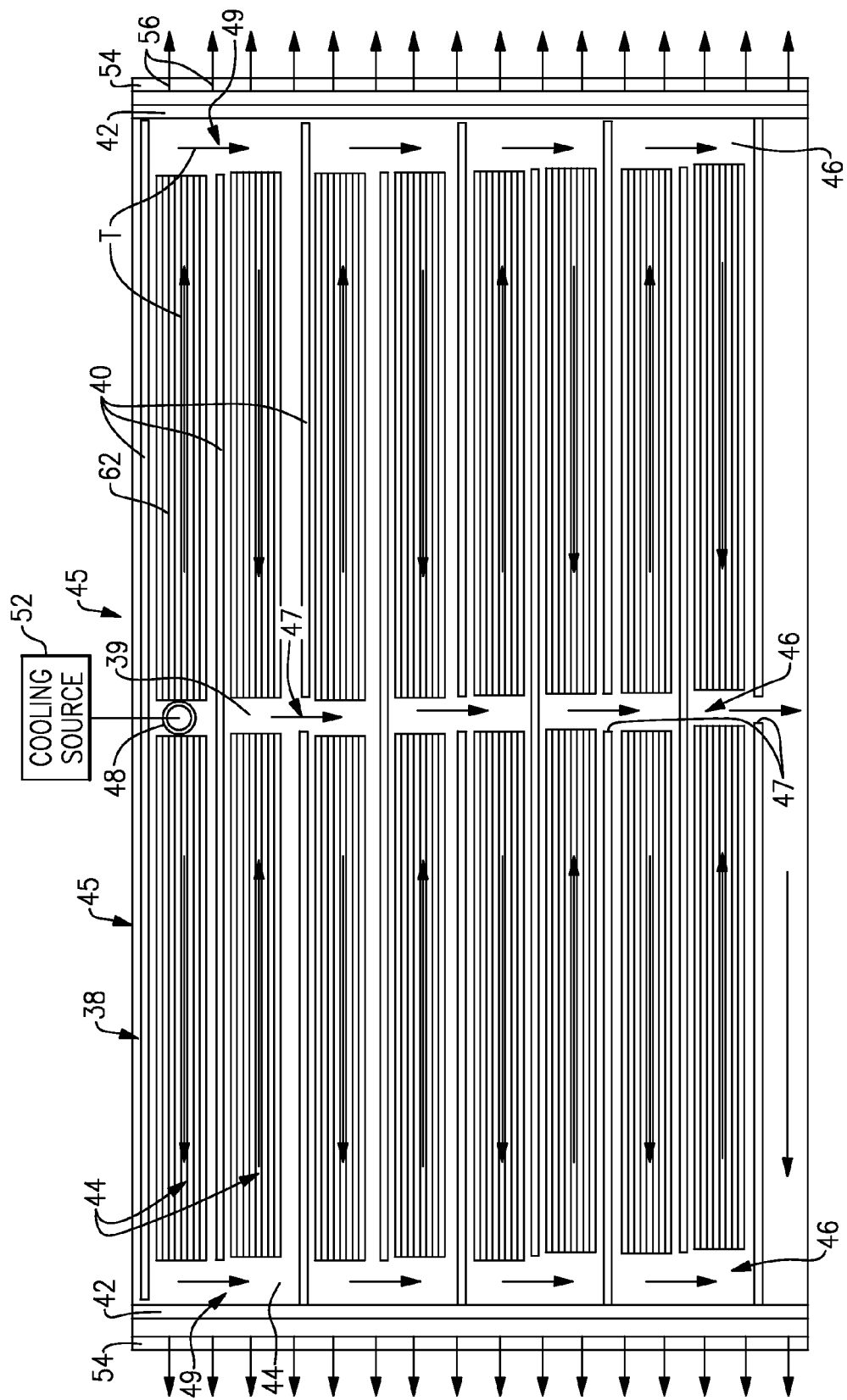
FIG. 3B is a schematic plan view of the sleeve shown in FIG. 3A.

Referring to FIGS. 2, 3A and 3B, first and second channels, 44, 46 are arranged about the circumference of the stator 28 and provide a tortuous flow path T, for example, alternating flow directions along each adjacent first channel 44 (shown). In the example illustrated, the first channels 44 extend in an axial direction and are arranged circumferentially about the stator 28, and the second channels 46 are annular passages arranged at either end of the stator 28. In one example shown in FIGS. 3A-4, a second channel 46 is arranged generally centrally on the stator 28 to separate the tortuous flow path T into two sections 45. It should be understood that the tortuous flow path T may be separated into more sections if desired. An inlet 48 is in fluid communication with a cooling source 52 and communicates a cooling fluid to the centrally located second channel 46 (FIG. 3B).

The sleeve 38 provides an inner surface 39. First and second walls 40, 42 extend from the inner surface 39 to provide the first and second channels 44, 46. In the example, the first walls 40 extend axially and radially outward and are arranged circumferentially about the sleeve 38. The second walls 42 adjoin the first walls 40 to provide the tortuous flow path T. In the example, one of the first walls 40 (e.g., topmost wall in FIG. 3B) extends between the opposing second walls 42 on either end of the stator 28, extending across and blocking the outermost and centrally located second channels 46. The next first wall 40 is spaced from the second walls 42 at the ends of the stator 28 to provide gaps 49, while extending across and blocking the centrally located second channel 46. The next first wall 40 extends between the opposing second walls 42 providing a gap 47 in the area of the centrally located second channel 46 and blocking the outermost second channels 46.

The above described configuration produces alternating flow directions through the first channels 44, as best illustrated in FIGS. 3A and 3B. It should be understood that other configurations of walls and channels may be used. Additional first walls 40 may be used and spaced apart from one another, as illustrated in FIG. 2, to accommodate housing fins 36 that further obstruct fluid flow between adjoining first channels 44.

Referring to FIGS. 3A, 3B and 4, an orifice plate 54 may be provided on opposing ends of the sleeve 38 to spray cooling fluid through holes or exits 56 in the orifice plate 54 onto end turns 58, which extend in generally axially opposing directions from the main stack 59 of the stator 28 in the example. An end cap 60 is arranged over each end turn 58, and in one example, seal between the main stack 59 of the stator 28 and the housing 18 to prevent the cooling fluid sprayed from the orifice plates 54 from falling onto the rotor 30, which prevents machine level windage and friction loss. An outlet 50 is in fluid communication with the enclosed end turn 58 to drain cooling fluid that accumulates in the end cap 60.

Figure 5:
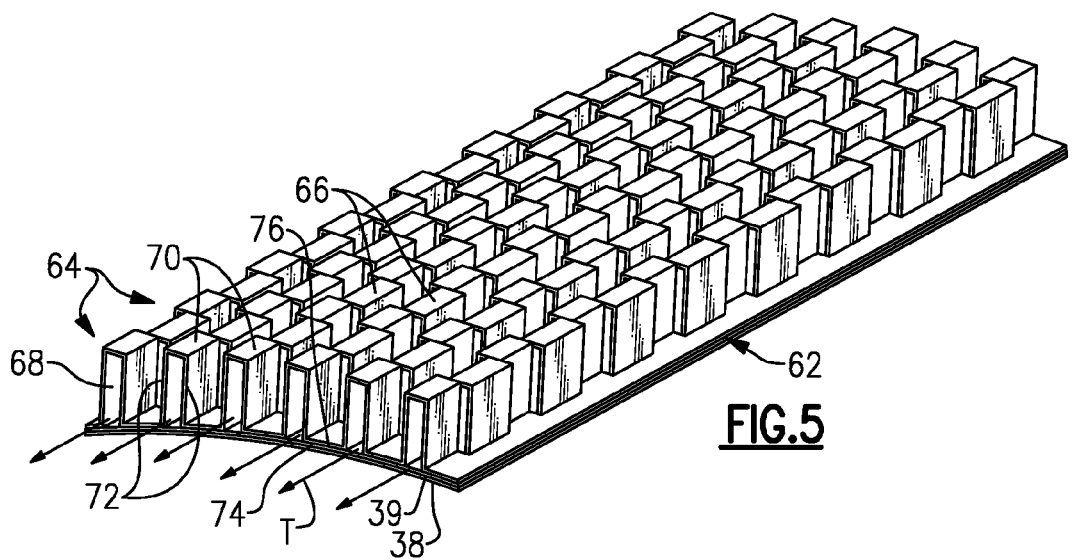
FIG. 5 is a perspective view of a fin core that is provided in channels on the sleeve.

Referring to FIGS. 2, 3A and 5, a structure, such as a fin core 62, is provided in at least one of the first and second channels 44, 46. In the example, a base 74 of the fin core 62 is secured to the inner surface 39 of the sleeve 38 using a braze material 76. The fin core 62, which provides significant surface area in the first and second channels 44, 46, is constructed from a lanced aluminum material that provides rows 64 of undulations or corrugations 66, which are arranged in an alternating relationship in the example shown. The undulations 66 include legs 72 that extend from the base 74 and support an outer surface 70 spaced from the base 74 and the inner surface 39 to provide a flow passage 68. In this manner, the outer surface 70 retains the fluid flow (indicated by arrows exiting the flow passage 68) within the first channel 44 even at elevated temperatures in which the stator 28 and sleeve 38 become spaced from the housing 18. The legs 72 also retain the cooling fluid in the first channels 44, which prevents cooling fluid from entering an adjacent cooling channel and changing its flow direction thereby reducing cooling efficiency.

Although an example embodiment has been disclosed, a worker of ordinary skill in this art would recognize that certain modifications would come within the scope of the claims. For that reason, the following claims should be studied to determine their true scope and content.

What is claimed is:

1. An electric machine comprising:
a stator having an outer circumference;
spaced apart first walls arranged about the outer circumference providing generally parallel axially extending first channels, and a second wall adjoining the first walls and arranged about the outer circumference providing discrete, arcuate second channels in fluid communication with the first channels and providing a tortuous serpentine fluid flow path about the circumference that is configured to alternate between opposite axial fluid flow directions within the first channels, the first and second channels having an inner surface; and
a structure provided within at least one of the first and second channels and having an outer surface spaced radially outward from the inner surface to provide a flow passage and at least partially defining the tortuous fluid flow path between the outer and inner surfaces, wherein the structure is provided by a fin core including rows of corrugations, the corrugations include spaced apart legs and the outer surface, which is supported by the legs, the flow passage is defined by the inner and outer surfaces and the spaced apart legs.

2. The electric machine according to claim 1, wherein the stator includes at least one wire winding providing a main stack and end turns extending generally axially outwardly from the main stack in opposite directions from one another, and a rotor disposed within the stator.

3. The electric machine according to claim 1, wherein the first walls extend in a generally axial direction and are circumferentially spaced about the outer circumference, and the second wall is generally annular and arranged transverse from the first walls, the fluid configured to flow from one first channel through one second channel to another first channel that is adjacent the one first channel to provide the tortuous serpentine fluid flow path.

4. An electric machine comprising:
a stator having an outer circumference;
spaced apart first walls arranged about the outer circumference providing generally parallel axially extending first channels, and a second wall adjoining the first walls and arranged about the outer circumference providing discrete, arcuate second channels in fluid communication with the first channels and providing a tortuous serpentine fluid flow path about the circumference that is configured to alternate between opposite axial fluid flow directions within the first channels, the first and second channels having an inner surface;
a structure provided within at least one of the first and second channels and having an outer surface spaced radially outward from the inner surface to provide a flow passage and at least partially defining the tortuous fluid flow path between the outer and inner surfaces; and
wherein the first walls extend in a generally axial direction and are circumferentially spaced about the outer circumference, and the second wall is generally annular and arranged transverse from the first walls, the fluid configured to flow from one first channel through one second channel to another first channel that is adjacent the one first channel to provide the tortuous serpentine fluid flow path, wherein the tortuous fluid flow path provides at least two sections with a second channel provided generally centrally about the outer circumference.

5. The electric machine according to claim 4, wherein at least one of the first walls includes gaps at either end between the first wall and spaced apart second walls, another first wall including a gap generally centrally located along the stator.

6. The electric machine according to claim 1, comprising a sleeve supported by the stator, the sleeve including the first and second walls, which extend radially outwardly to a housing within which the stator is disposed.

7. The electric machine according to claim 6, wherein the housing includes fins extending radially inwardly toward the sleeve and adjacent to the first walls.

8. The electric machine according to claim 1, wherein the rows are offset from one another.

9. The electric machine according to claim 1, wherein the fin core is brazed to a sleeve mounted on the stator.

10. The electric machine according to claim 1, wherein the corrugations are provided by a lanced material.

11. The electric machine according to claim 1, wherein the corrugations provide multiple undulations staggered with respect to one another to provide the tortuous fluid flow path.

* * * * *